US009466042B2

(12) United States Patent
Temple, III (10) Patent No.: US 9,466,042 B2
(45) Date of Patent: Oct. 11, 2016

(54) FACILITATING THE DESIGN OF INFORMATION TECHNOLOGY SOLUTIONS

(75) Inventor: Joseph L. Temple, III, Hurley, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 708 days.

(21) Appl. No.: 13/356,760

(22) Filed: Jan. 24, 2012

(65) Prior Publication Data

US 2013/0191086 A1    Jul. 25, 2013

(51) Int. Cl.
 G06F 7/60    (2006.01)
 G06F 17/10   (2006.01)
 G06Q 10/06   (2012.01)

(52) U.S. Cl.
 CPC ................ *G06Q 10/0637* (2013.01)

(58) Field of Classification Search
 None
 See application file for complete search history.

(56) References Cited

U.S. PATENT DOCUMENTS

| | | | | |
|---|---|---|---|---|
| 7,467,291 | B1* | 12/2008 | Cockroft | G06F 9/5061 713/1 |
| 7,676,596 | B1 | 3/2010 | Pereira | |
| 2004/0267897 | A1* | 12/2004 | Hill et al. | 709/217 |
| 2005/0165970 | A1* | 7/2005 | Ching | G06F 13/4072 710/1 |
| 2007/0099647 | A1* | 5/2007 | Lee | H04W 52/367 455/522 |
| 2007/0220516 | A1* | 9/2007 | Ishiguro et al. | 718/101 |
| 2007/0233866 | A1* | 10/2007 | Appleby et al. | 709/226 |
| 2008/0062890 | A1* | 3/2008 | Temple | 370/254 |
| 2008/0086734 | A1* | 4/2008 | Jensen | G06F 9/4881 718/104 |
| 2009/0097412 | A1 | 4/2009 | Jain et al. | |
| 2010/0091730 | A1 | 4/2010 | Jang et al. | |
| 2011/0106501 | A1* | 5/2011 | Christian et al. | 703/1 |

OTHER PUBLICATIONS

Tan et al., Exploiting Resource Usage Patterns for Better Utilization Prediction, 2011, IEEE, pp. 14-19.*
Lehman et al., Performance of a simulated multiprogramming system, 1968, Computer History Museum, pp. 1431-1442.*
Cook, Server utilization: Joel on queuing, Jan. 30, 2009, Singular Value Consulting, pp. 1-2.*
Reiser et al., "Finite Capacity Queuing Systems with Applications in Computer Modeling," IP.com; IP.com No. IPCOM000148706D; Original Publication Date: Jan. 26, 1976; 41 pgs.
Reiser et al., "Queuing Networks with Several Closed Subchains: Theory and Computational Algorithms," IP.com; IP.com No. IPCOM000148477D; Original Publication Date: Jul. 3, 1974; 41 pgs.

* cited by examiner

*Primary Examiner* — Kibrom K Gebresilassie
*Assistant Examiner* — Bernard E Cothran
(74) *Attorney, Agent, or Firm* — Cantor Colburn, LLP; Margaret McNamara (57) ABSTRACT

A method includes determining an anticipated usage pattern for an information technology system and a desired service level for the information technology system. The method includes determining a utilization saturation point for the information technology system and selecting a number of servers in the information technology system. The method also includes calculating one or more performance characteristics for the information technology system based on the anticipated usage pattern, the desired service level, the utilization saturation point, and the number of servers and comparing the one or more performance characteristics for the information technology system with one or more desired performance characteristics for the information technology system.

6 Claims, 9 Drawing Sheets

FACILITATING THE DESIGN OF INFORMATION TECHNOLOGY SOLUTIONS

BACKGROUND

The present disclosure relates to the design of information technology systems, and more specifically, to methods and computer program products for facilitating the design of infrastructure design of information technology systems.

Typically, the design of an infrastructure for an information technology system begins with the creation of an abstract architectural model. From the abstract architectural model an operational diagram of an architecture is created, which in turn is used to create an implementation specification. As part of the implementation specification it is necessary to assess and/or specify the non functional requirements of the information technology system.

These requirements have to be applied to the specification of hardware infrastructure to implement the architecture. While current architectural methods provide for steps and actions in which this is done, the methods do not provide guidance for performing this task. Current design methods do not take into account the effects of scaling and availability on such parameters as saturation design point or average utilization or the impact of parameter specification on decisions about distribution or consolidation. Furthermore, the situation is complicated by the interaction of the capacity and performance requirements, which create trade offs restricting the set of viable solutions. Currently implementation specifications are created mainly by conservative guesswork that results in either over or under designed solutions.

SUMMARY

According to one embodiment, a method for designing the infrastructure of an information technology solution includes determining an anticipated usage pattern for an information technology system and a desired service level for the information technology system. The method includes determining a utilization saturation point for the information technology system and selecting a number of servers in the information technology system. The method also includes calculating, with a processor, one or more performance characteristics for the information technology system based on the anticipated usage pattern, the desired service level, the utilization saturation point, and the number of servers and comparing the one or more performance characteristics for the information technology system with one or more desired performance characteristics for the information technology system.

According to another embodiment, a computer program product for designing the infrastructure of an information technology solution, the computer program product including a tangible storage medium readable by a processing circuit and storing instructions for execution by the processing circuit for performing a method including determining an anticipated usage pattern for an information technology system. The method also includes determining a desired service level for the information technology system. The method also includes determining a utilization saturation point for the information technology system and selecting a number of servers in the information technology system. The method further includes calculating one or more performance characteristics for the information technology system based on the anticipated usage pattern, the desired service level, the utilization saturation point, and the number of servers and comparing the one or more performance characteristics for the information technology system with one or more desired performance characteristics for the information technology system.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

In accordance with exemplary embodiments of the disclosure a method for facilitating the infrastructure design of information technology solutions is provided which allows for estimation of the tradeoffs between capacity and performance through the consideration of a relatively few parameters. In addition, the method for facilitating the infrastructure design of information technology solutions provides feedback regarding the implication of modifying various parameters in the design specification.

Figure 1:
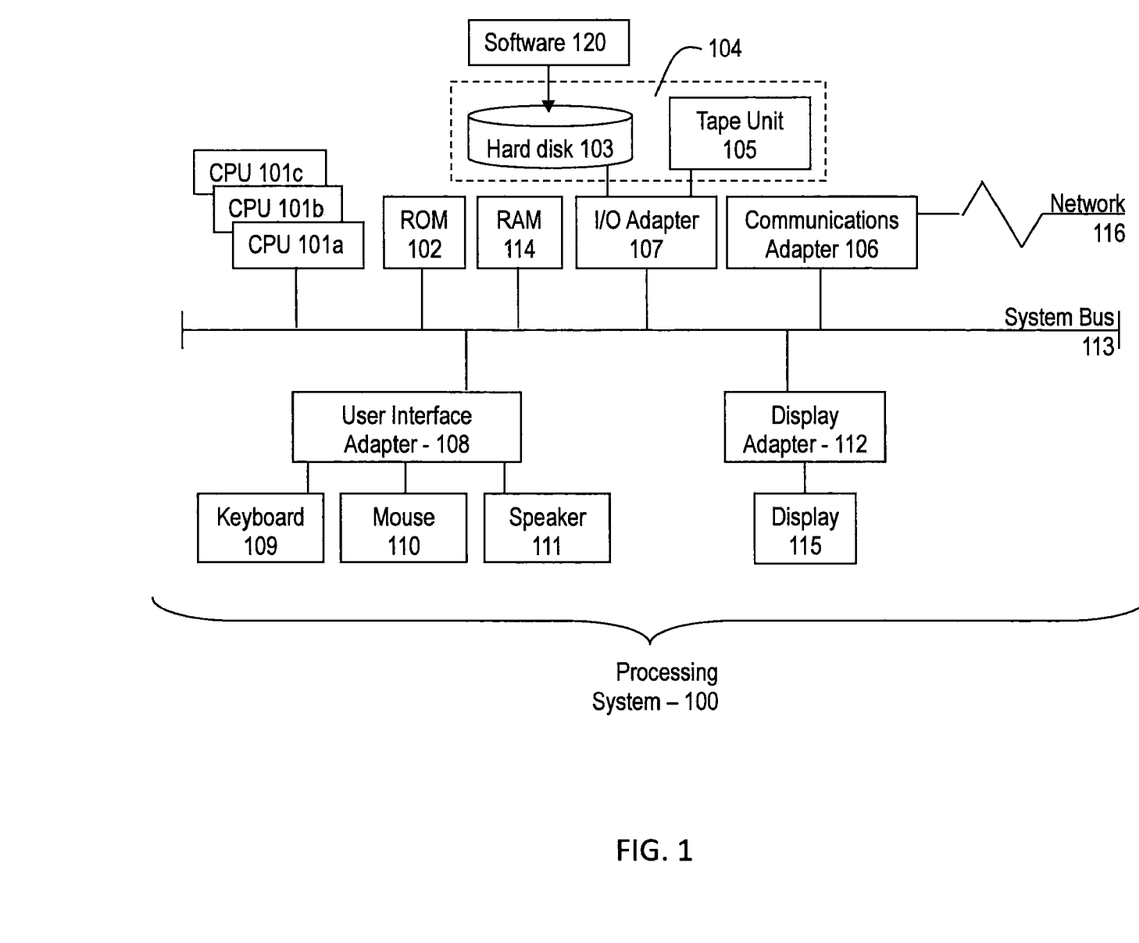
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104.

Software 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

The design of an information technology system involves several interlocking trade-offs between throughput, response time, and utilization efficiency of the system. If the system is designed for high efficiency with a high utilization at average load the response time will suffer. If the system is designed for high throughput and low response time the utilization at average load will drop. In addition, the variability of the load will affect the magnitude of these tradeoffs. As used herein, the term headroom is defined as the difference between the available capacity of a system and the capacity used by the system. Thus the system capacity is equal to the throughput plus the headroom.

Headroom is a convenient way to quantify the trade offs between throughput, response time, and utilization efficiency of the system. It is also a useful metric for analyzing the operational behavior of existing systems. Headroom may be normalized and represented as the ratio of the capacity available in a system to the capacity already used by the system. Because normalized headroom is a ratio of capacities it can be used without regard to the specific capacity metrics involved. Accordingly, normalized headroom is a useful in comparing the operational behavior of systems which have different capacity metrics.

The utilization of a system can be represented by the following equation:

Utilization($u$)=Throughput/(Throughput+Headroom).

Which can be rearranged into the following equation:

Utilization($u$)=1/(1+Headroom/Throughput)

Defining a term for Normalized Headroom (HR) as:

HR=Headroom/Throughput

Utilization can be represented as:

Utilization($u$)=1/(1+HR)

Solving the above equation for HR:

HR($u$)=(1−$u$)/$u$

Rogers' Equation for utilization states that HR at average utilization over any interval is also related to the load variability (c), a service level multiplier (k), and the number of servers (N) handling the load:

$U$avg($N$)=1/(1+$kcN^{1/2}$)

By inspection:

HR($U$avg($N$))=$kcN^{1/2}$

The function HR(u)=(1−u)/u is the same as the inverse of the utilization term in the equation for the time spent waiting on queue, for a G/G/1 queue. A queuing theory model for wait time is:

$t_{wait}=t_0c^2u/(1-u)$ which is $t_{wait}=t_0c^2/\text{HR}(u)$

Solving for HR we get:

HR=$t_0c^2/t_{wait}$

Since the service time ($t_0$) for a particular system is not always known, rearranging the above equation can be rearranged into the following form:

$t_{wait}/t_0=c^2/\text{HR}$

The above equation implies that the ratio of the wait time to the response time is governed by the load variability (c) and HR. When a load is distributed with variability over N servers, each individual server sees variability increased by $N^{1/2}$, therefore:

$t_{wait}/t_0=Nc^2/\text{HR}$

Since the utilization of a system is strongly correlated to headroom it is important to understand utilization. At any instant in time, a processor is either busy or idle. Utilization is the count of busy cycles divided by the count of cycles in some interval of time. If the load on a system is variable, over time there will be an associated deviation from the average, or mean, utilization. The deviation from the mean utilization typically diminishes as the size of the interval over which u is measured gets longer. As the time interval increases the sampled utilization values smooth out and approach the long term average utilization. Conversely, as the time interval decreases the sampled utilization values diverge toward the idle and busy states.

In an exemplary embodiment, for a system containing one single threaded processor core, it is only through averaging over a number of discrete time intervals, or processor cycles, that values between 0 and 1 emerge. As more processor cores are added, capacity also appears in discrete quanta. At any instance in time, each core is either busy or it is not. As the number of cores increases, the relative size of the quanta shrinks. The instantaneous utilization will always be busy cores/total cores. Since we cannot create fractional processors this is a ratio of positive integers. The number of instantaneous utilization states that machine can take is 1+p, where p is the number of cores.

In an exemplary embodiment, if there are more processor cores available than the software can activate the short term utilization peak will always be less than 1, because it will be impossible the achieve the states with all threads buys beyond the state at which all software threads are running concurrently. However, for most loads there are busy periods with more potentially active software threads than the hardware can activate concurrently. As a result, the measurable peak for multithreaded multiprocessors approaches 100% for short intervals. As the time interval decreases it becomes more likely that during some sample enough threads are active to fill the machine. The only way that this fails to happen is if the scheduling algorithm uses processor affinity for extended periods of time and processes are long running enough that some engines have work on queues while other processors are idle. In any case, the maximum potential peak utilization of the machine is 100% unless there is a low enough software limit to the concurrent thread count.

The coefficient of variability (c) affects both headroom and response time. Load variability is driven by the underlying business process of the solution which generates a usage pattern. It is also driven by the tiering of solutions in the usage pattern. Generally, variability tends to accumulate as work traverses the tiers of a client/server solution. In addition, delays between and within each tier also tend to create short term burstiness of the load, which increases the effects of variability. Increasing the number and intensity of the short term peaks in the load, a higher service level multiplier (k) is required to meet the desired response time objectives.

The usage pattern in the short run will vary significantly on individual loads unless the variation is smoothed by long software path length, batching, a message queue process, or the work is generated by an automatic and regular sampling interval. Analytics, high performance computing and long running mathematically driven algorithms will drive higher frequency non random usage patterns than interactive business processing and real time processing of "random event streams". The lack of randomness in analytic usage patterns often pushes the coefficient of variability to be low even at short intervals.

Figure 2A:
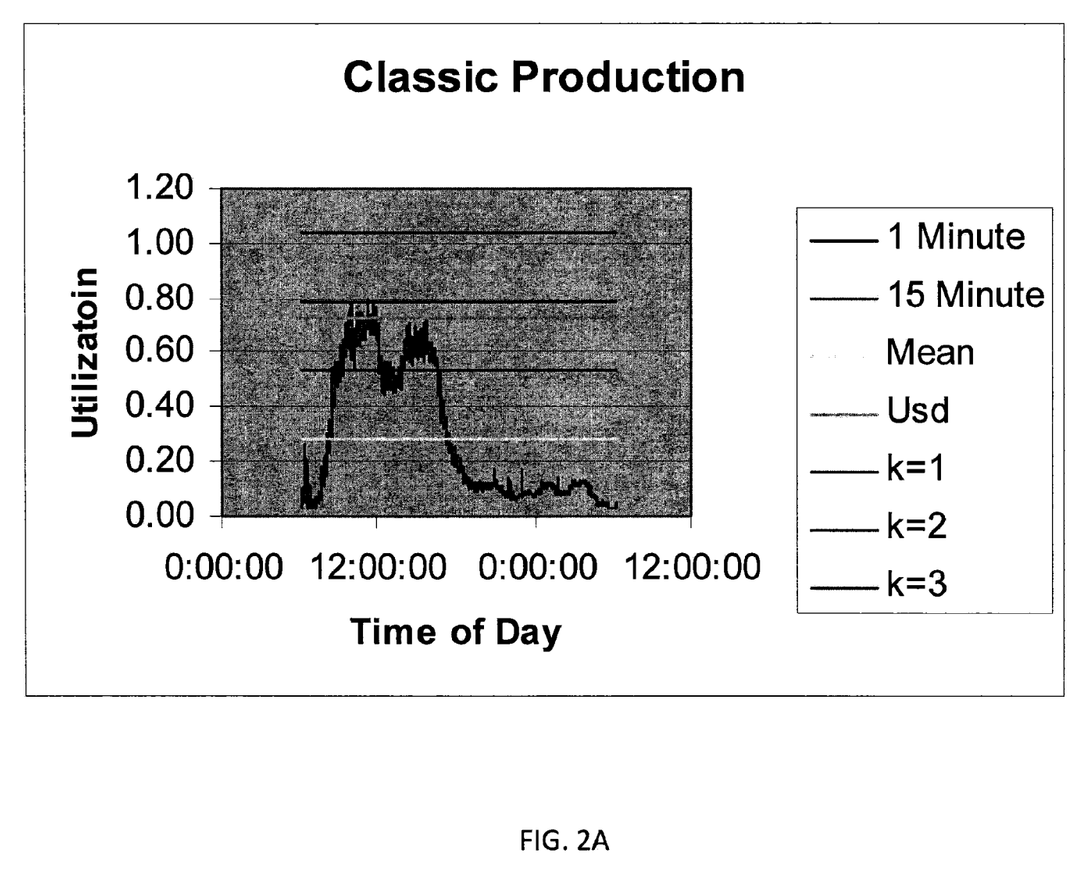
FIGS. 2A-2D are graphs illustrating a variety of usage patters in exemplary information technology systems.

Measurement of a system's response to the usage pattern is usually done by taking interval data of processor utilization. FIGS. 2A-2D are graphs illustrating a variety of usage patters in exemplary information technology systems, in each graph the utilization data points have been smoothed by averaging the system utilization over both one and fifteen minute intervals. FIG. 2A shows a graph illustrating a classic production server usage pattern, which includes a saddle in the data when users go to lunch at noon. As shown in FIG. 2A, variability (c)=0.86 which is moderate. The long term peak is at around k=2.

Figure 2B:
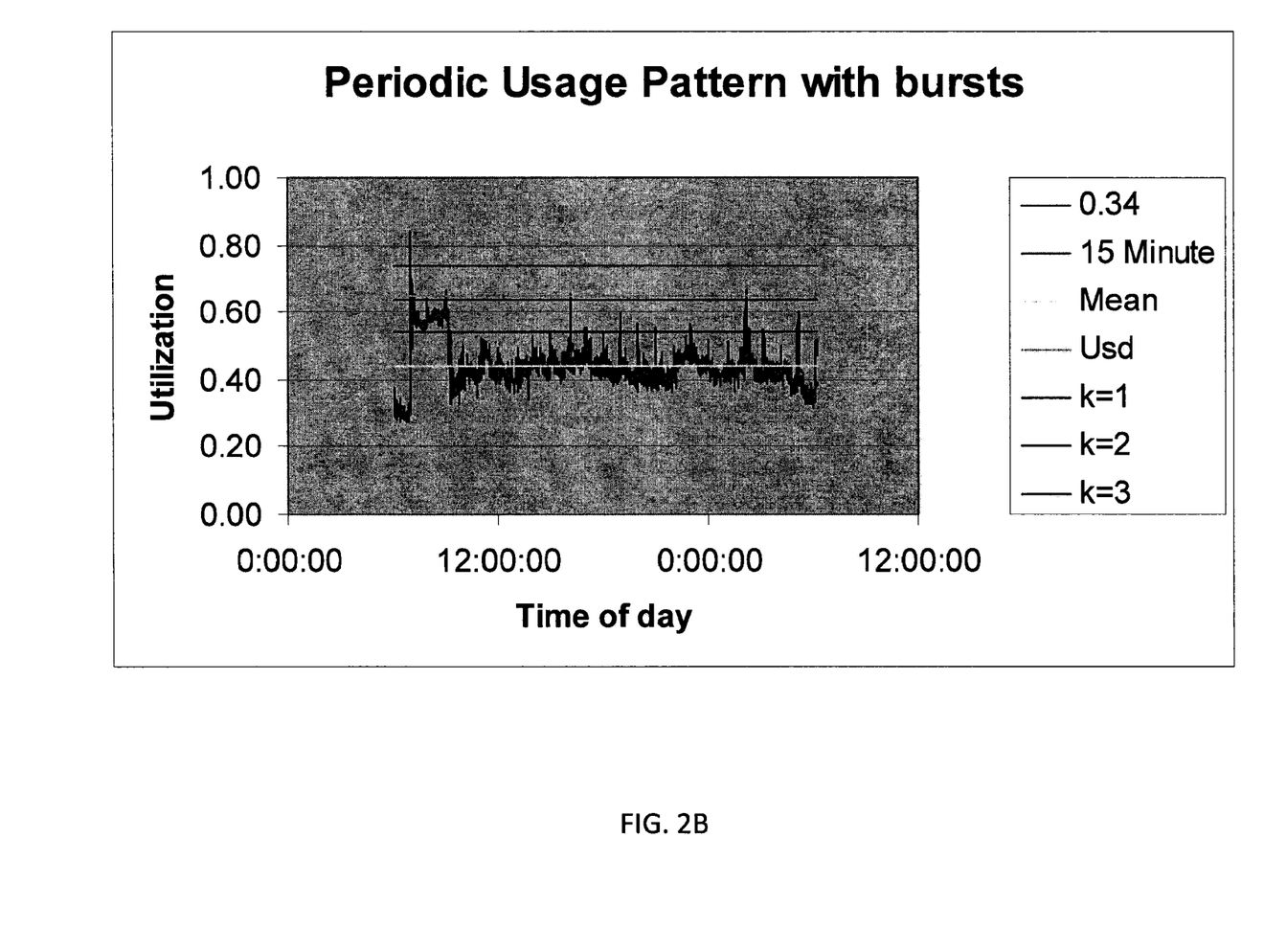

FIG. 2B shows a graph illustrating a periodic usage pattern with bursts of higher demand. As shown in FIG. 2A, variability (c)=0.16, which is very low. The 1 minute interval peak is above k=3, which indicates a burst which is seen at the beginning of the day. There are also several bursts throughout the day driven by the periodic nature of the load. With the exception of the beginning of the day, the long term peaks are well below k=1 while the 1 minute peaks are at approximately k=2.

Figure 2C:
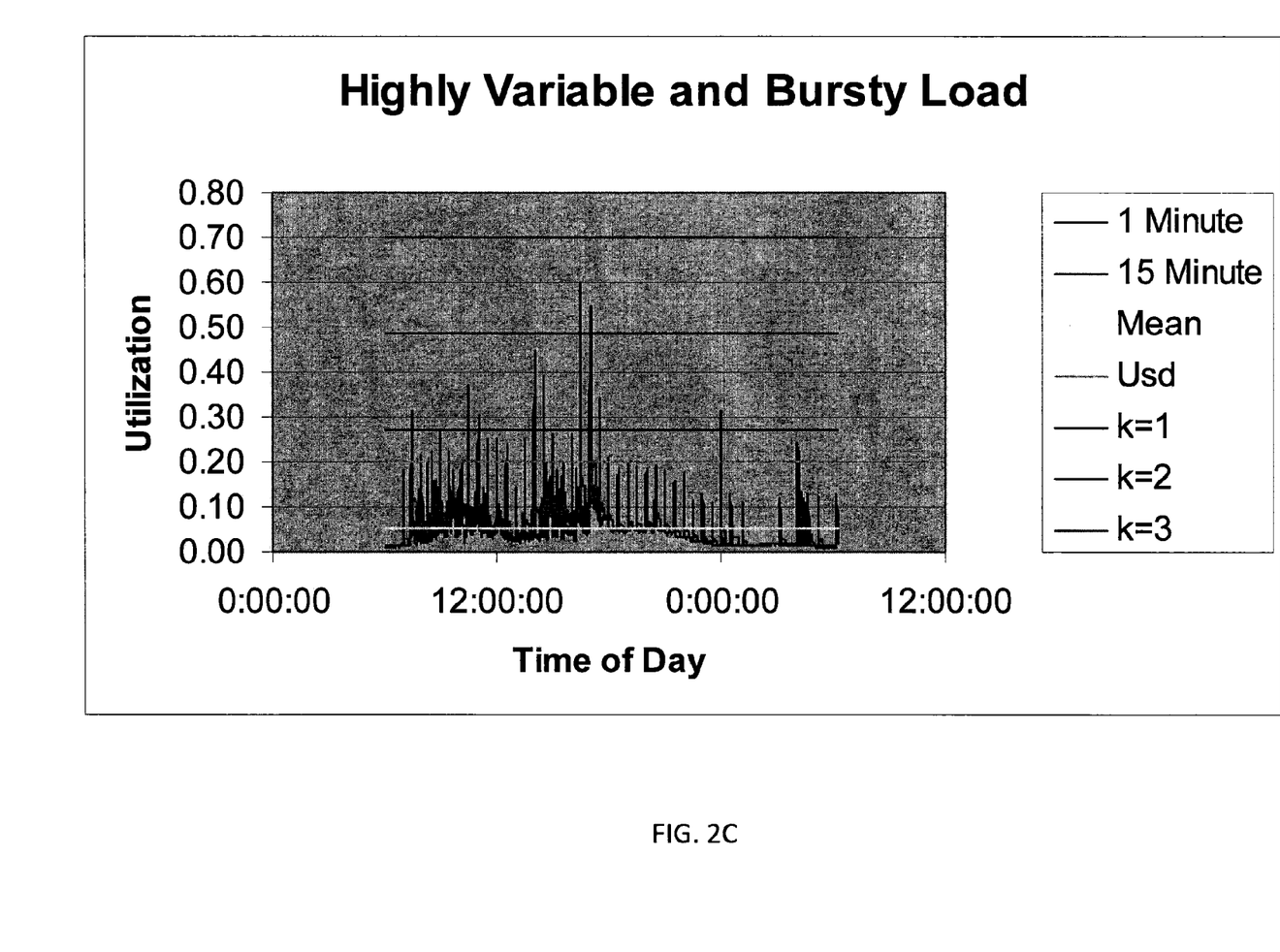

FIG. 2C shows a graph illustrating a periodic variable load with short duration peaks. The variability (c)=1 and the average utilization is below k=1. The one minute peaks are well above k=2. This is not extremely bursty but the peaks get contained by a k=3 design rather than a k=2 design that would contain the classic production pattern in FIG. 2A.

Figure 2D:
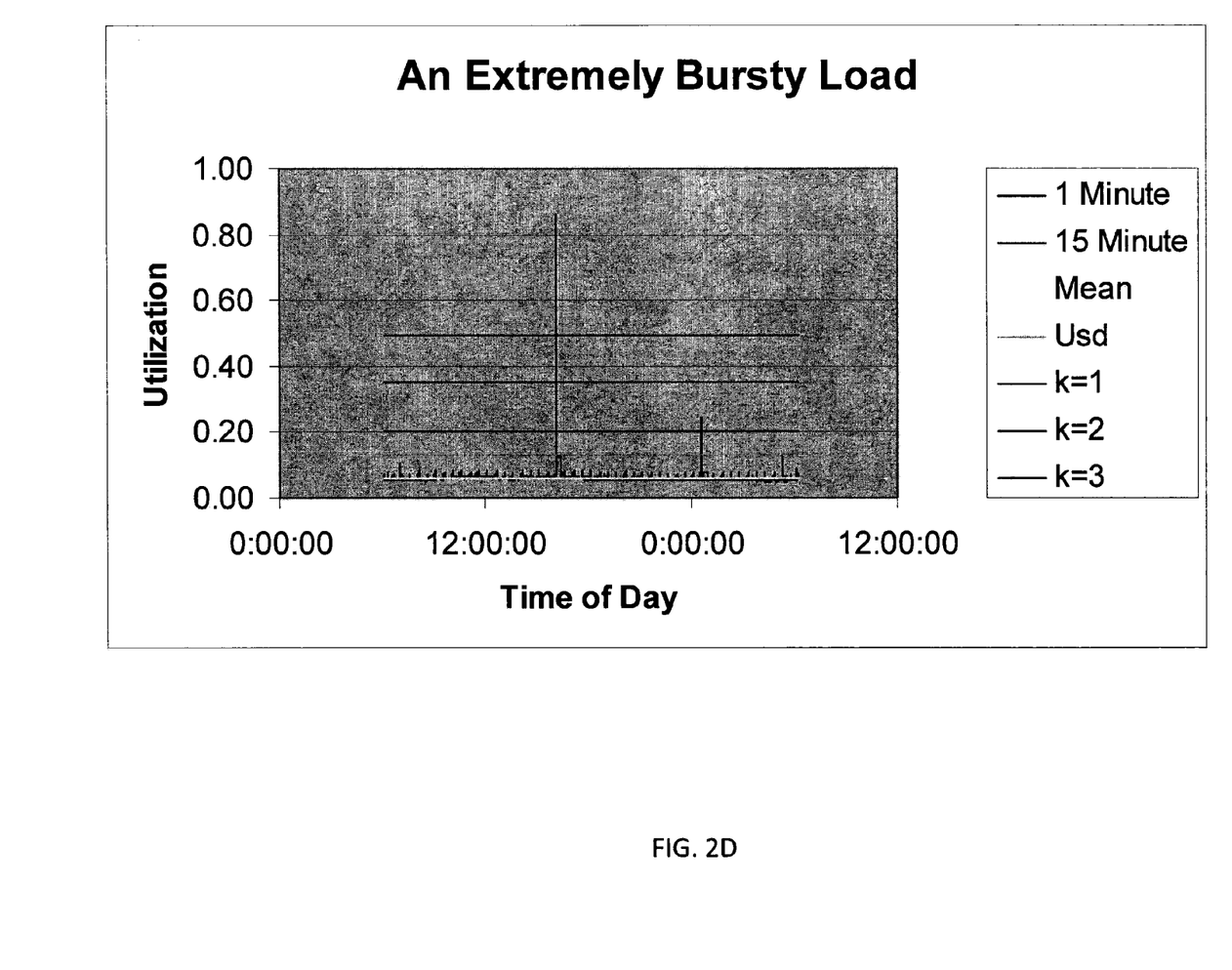

FIG. 2D shows a graph illustrating an extremely busty load. The variability (c)=0.39 which is low. The average utilization is far below k=1, and the 1 minute peak is very much higher than the k=3. Use of standard variability analysis, setting k=2 or even k=3 here will experience longer wait times during the peak demand.

As illustrated by FIGS. 2A-2D, usage patterns can be somewhat regular and spiky, variable and yet more sustained, or variable and spiky. The coefficient of variability (c) is the standard deviation divided average of a random distribution. A system is normally designed to be able to handle spikes in demand up to some number of standard deviations (k) above the average. In many information technology systems designs k is often set as 2. For the bursty loads k=2 will experience longer wait times during the peak demand.

The saturation design point (Usd) is the highest utilization at which the system is designed to run for an extended period of time. There are many reasons for setting this below 100% including, but not limited to: load variability; queuing effects; "saturation" effects from cache misses and serializations (e.g., locking and context switching); software defect rates; non linear scaling; active redundancy for availability; growth; and stepwise increments in capacity. The saturation design point is defined as the average utilization at the peak of a running average of some long term interval. System compliance with the desired saturation design point can be determined by measuring average utilization on shorter intervals and examining the peaks of a running long term average. This is illustrated in FIGS. 2A-2D by the 15 minute running average from 1 minute interval samples.

Headroom (HR) can be used to determine the relationship of N, k and c for a given Usd as demonstrated by the following equations:

$$N=((1-Usd)/kcUsd)^2 \text{ and } N=(\text{HR}(Usd)/kc)^2$$

Figure 3:
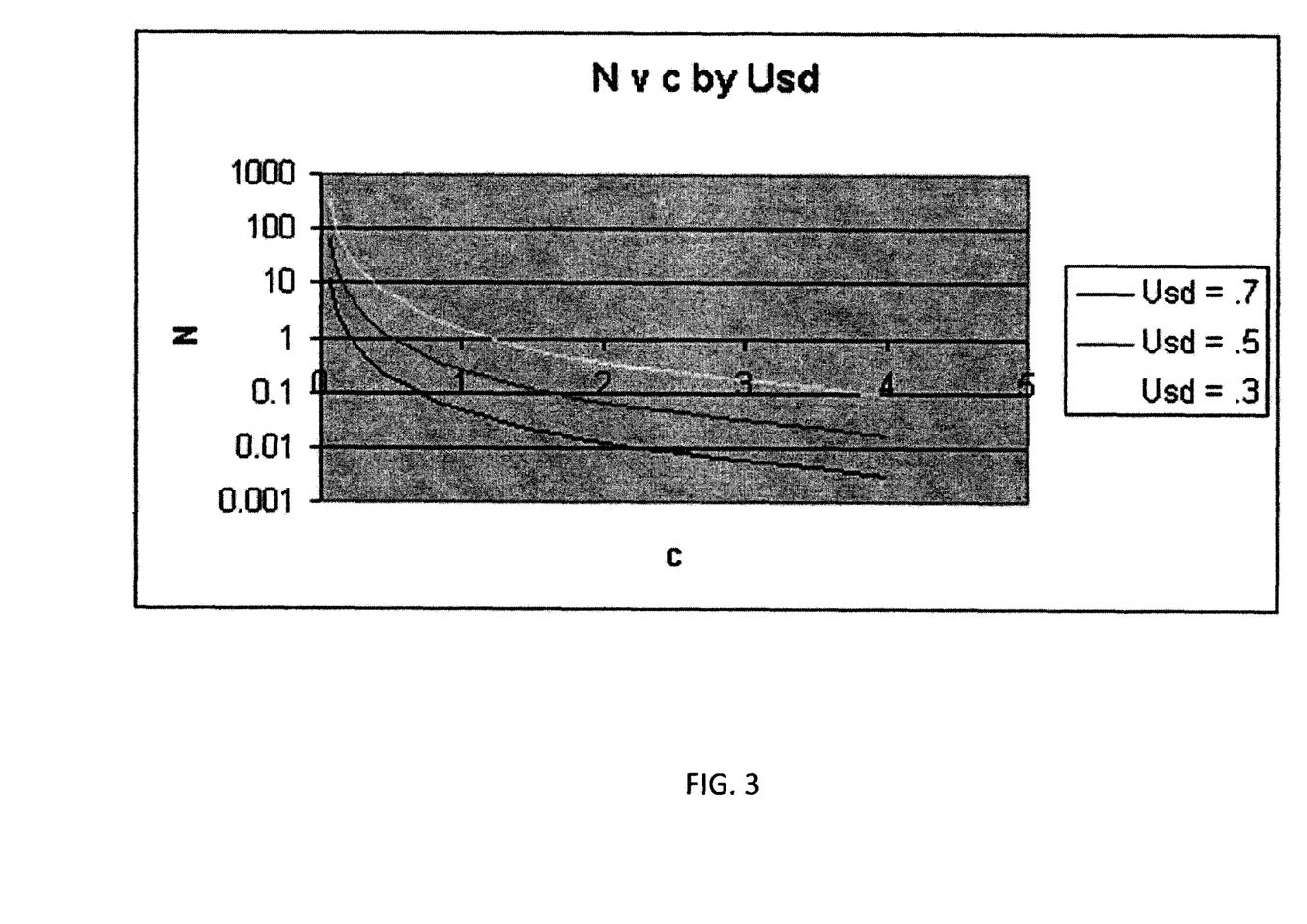
FIG. 3 is a graph illustrating the relationship between the number of servers and the variability in exemplary information technology system.

FIG. 3 is a graph illustrating the relationship between the number of servers (N) and the variability (c) with k=2 and Usd as a parameter. While N, Usd, and k are design parameters, c is a "local factor" that determined by how the users drive the system. Illustrated by FIG. 3, by setting any two of the three design parameters and given a value of variability (c) the viable values of the third variable are limited. Accordingly, understanding headroom leads to quantification of the trade offs between the essential design parameters. If N is split into the integer forms of s representing servers per load and n representing the loads per server, the viable values of that determine the solution design can be further limited by noting that s is always an integer and n is always the inverse of an integer.

Figure 4:
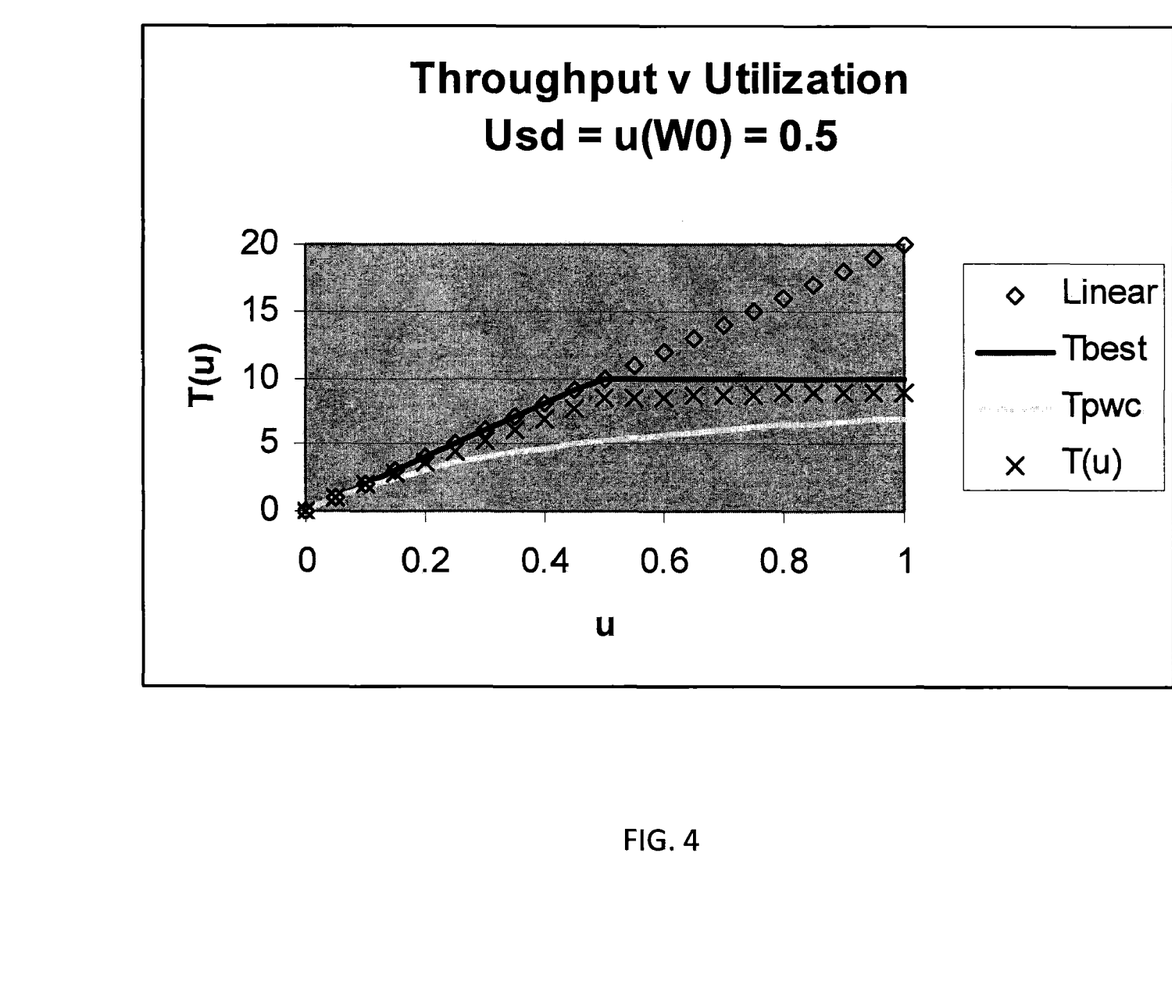
FIG. 4 is a graph illustrating the relationship between throughput and utilization in exemplary information technology system.

Throughput of the system can be represented as function of the work in progress, T(W). Throughput has a maximum of $T_b$, the bottleneck throughput rate that T(W) approaches asymptotically as the workload increases. In some systems, a saturation point $W_0$ and $T(W_0)$ is reached before the system utilization (u) reaches 100%. This usually happens when a system is I/O bound. In these cases, utilization will not go past $u(W_0)$ even as more work is added to the system. I/O is not the only source of this kind of limit. For example, if the software has fewer threads than the hardware provides at 100% utilization, the program will not drive utilization higher the maximum threads in the load that it can keep busy divided by the hardware threads available. Thus if the software as a limit of 4 threads and the machine has a limit of 16 threads the maximum utilization will be 25%. Sometimes the CPU utilization can be 100% but the throughput does not follow suit because of a bottle neck other than the core capacity. This can happen when memory bandwidth, cache entries or cache to cache bandwidth becomes the limiting factor. FIG. 4 is a graph illustrating the relationship between throughput T(W) and utilization (u) showing a saturation point at 50% utilization.

Figure 5:
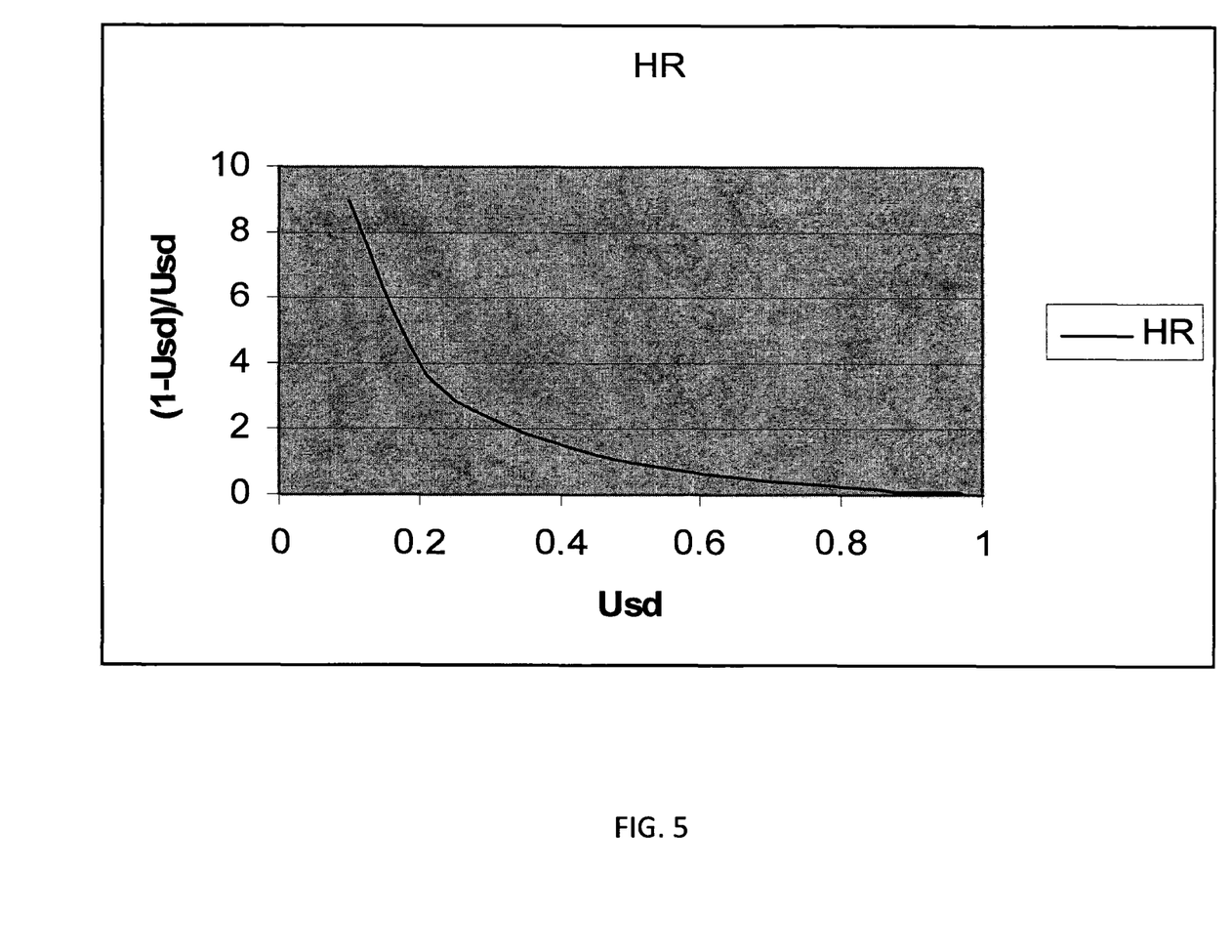
FIG. 5 is a graph illustrating the relationship between headroom and the utilization saturation design in exemplary information technology system.

Referring now to FIG. 5, a graph illustrating the relationship between headroom (HR) and the utilization saturation design (Usd) is shown. FIG. 5 illustrates the HR that results from setting a specific Usd value as part of the design of the system. As illustrated, setting the Usd>0.5 will result in the HR<1. As the HR approaches zero, the Usd approaches 1. Accordingly, part of designing a viable system is to understand the desired HR at the long term peak load.

As derived above HR can be represented by the following equation:

$$HR=(1-u)/u=t_0c^2N/t_{wait}$$

In addition, at average utilization HR can be represented by the following equation:

$$HR=kcN^{1/2}$$

In the above equations: k is a design constant related to the service level agreement or objective service level of the system; c is the coefficient variability of the measured load (Stdev/mean); N=1/n where n is the integer number of loads consolidated on one server; and N=s>1 where s is the integer number of servers carrying the load.

For the configuration where c is measured and N=1: u is the subinterval utilization; Usd is the utilization for the peak u on a long term interval created by the running average of u over the long interval; Upeak=1; Umax is the maximum sampled utilization; Uavg is the average utilization across all interval samples; $t_0$ is the unloaded service time; and $t_{wait}$ is the wait time at utilization u.

As shown above, HR can be expressed in the various following forms that are useful for the analysis of loads and the design of information technology systems:

$$HR(Avg)=kcN^{1/2} \quad HR(u)=(1-u)/u \quad HR(t_0/t_{wait})=c^2t_0/t_{wait}$$

Accordingly, in designing information technology systems a higher service level, higher value k, will result in reduced system utilization. In addition, more variable loads will also result in lower utilization. Since burstiness of the load requires a higher k it will drive lower utilization, even if variability (c) is low. In general, consolidating more than one load will yield higher utilization and distributing a single load across multiple servers will yield lower utilization.

In designing an information technology system, setting the saturation design point (Usd) will determine Uavg and the viability of the Usd can be determined by the variability (c), the service level (k), and the distribution/consolidation (N). Once the Usd is set, $t_{wait}$ and the ratio of $t_{wait}$ to $t_0$ which will set the response time during the peak long term interval can be determined.

While for purposes of designing an information technology system, $t_0$ is assumed to be a constant. It can, in fact, vary both randomly or non-randomly with time and as a function of utilization. The effect of utilization on $t_0$ is one reason for setting Usd<1. This is both server and workload dependent and can range from insignificant to severe. Usd is often set to a value where constant $t_0$ is an acceptable estimator.

The maximum response time of a system ($t_{max}$) and average utilization (Uavg) are affected the following inter-related variables: Usd, the utilization at the peak long term interval; N, the number of servers per load, or number of loads per server; c, the coefficient of variability; $t_0$, the service time for the work at hand; $t_{wait\ max}$, the maximum wait time or wait time at the Usd; and k, the number of standard deviations above the mean load in the system capacity. Accordingly, the design of a system involves several interlocking trade-offs. If the system is designed for high efficiency by increasing the Uavg specification the headroom will be low. This means that $kcN^{1/2}$ will be small, implying high Usd and also implying that $t_{wait}/t_0$ is high. As the load variability approaches zero, the effects of the other values on headroom, utilization, and response time also diminish.

Figure 6:
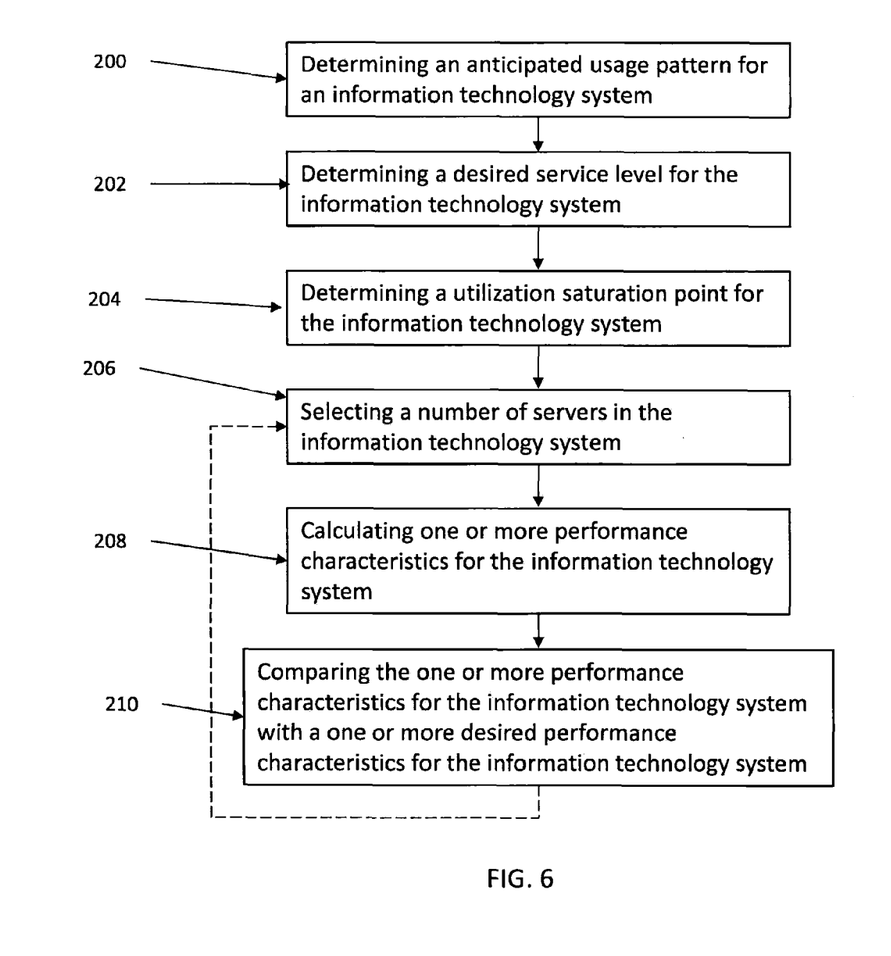
FIG. 6 is a method for designing the infrastructure of an information technology solution in accordance with an exemplary embodiment.

Turning now to FIG. 6, a flow chart illustrating a method for designing the infrastructure of information technology solution in accordance with an exemplary embodiment is generally shown. As shown at block 200, the method includes determining an anticipated usage pattern for an information technology system. Next, the method includes determining a desired service level for the information technology system, as shown at block 202. As shown at block 204, the utilization saturation point for the information technology system is determined. A number of servers in the information technology system, as shown at block 206. As illustrated at block 208, the method includes calculating one or more performance characteristics for the information technology system based on the anticipated usage pattern, the desired service level, the utilization saturation point, and the number of servers. After the performance characteristics are calculated, they are compared with one or more desired performance characteristics for the information technology system, as shown at block 210. If the performance characteristics are not with in the desired performance characteristics, the method may return to block 206 and the number of servers may be modified. The performance characteristic of the information technology system may include, but are not limited to the average utilization, the normalized headroom, the average wait time and/or the maximum wait time of the information technology system.

In exemplary embodiments, the method for designing the infrastructure of information technology solution can include displaying a characteristic curve, which shows the relationship between the wait time and utilization. The characteristic curve, and the points on, allows a user to evaluate multiple proposed infrastructure designs and which design best suits the requirements of the system. In addition, the method also facilitates a comparison of the total capacity and service times between the multiple proposed infrastructure designs.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A computer-implemented method comprising:
   determining an anticipated usage pattern for an information technology system, wherein the anticipated usage pattern includes a variability of load for the information technology system;
   determining a desired service level for the information technology system;
   determining a utilization saturation point for the information technology system, wherein the utilization saturation point is a highest utilization at which the information technology system is designed to run and utilization is determined based on a count of busy cycles for the information technology system divided by a count of cycles in an interval of time;
   selecting a number of servers in the information technology system;
   calculating, with a processor, one or more performance characteristics for the information technology system based on the anticipated usage pattern, the desired service level, the utilization saturation point, and the number of servers, wherein the one or more performance characteristics include a normalized headroom and at least one of an average wait time, a maximum wait time and an average utilization;
   comparing the one or more performance characteristics for the information technology system with one or more desired performance characteristics for the information technology system; and
   displaying, via a user interface, a characteristic curve of the information technology system which illustrates a relationship between the average utilization of the information technology system and one of the normalized headroom, the average wait time and the maximum wait time.

2. The method of claim 1, further comprising:
   selecting a revised number of servers in the information technology system;
   calculating one or more revised performance characteristics for the information technology system based on the anticipated usage pattern, the desired service level, the utilization saturation point, and the revised number of servers; and
   comparing the one or more revised performance characteristics for the information technology system with one or more desired performance characteristics for the information technology system.

3. The method of claim 1, wherein the normalized headroom of the information technology system is calculated by dividing a headroom of the information technology system by a throughput of the information technology system.

4. A computer program product for designing the infrastructure of an information technology solution, the computer program product comprising:
   a non-transitory tangible storage medium readable by a processing circuit and storing instructions for execution by the processing circuit for performing a method comprising:
   determining an anticipated usage pattern for an information technology system, wherein the anticipated usage pattern includes a variability of load for the information technology system;
   determining a desired service level for the information technology system;
   determining a utilization saturation point for the information technology system, wherein the utilization saturation point is a highest utilization at which the information technology system is designed to run and utilization is determined based on a count of busy cycles for the information technology system divided by a count of cycles in an interval of time;
   selecting a number of servers in the information technology system;
   calculating one or more performance characteristics for the information technology system based on the anticipated usage pattern, the desired service level, the utilization saturation point, and the number of servers, wherein the one or more performance characteristics comprise a normalized headroom and at least one of an average wait time, a maximum wait time and an average utilization;
   comparing the one or more performance characteristics for the information technology system with one or more desired performance characteristics for the information technology system; and
   displaying a characteristic curve of the information technology system which illustrates a relationship between the average utilization of the information technology system and one of the normalized headroom, the average wait time and the maximum wait time.

5. The computer program product of claim 4, wherein the method further comprises:
   selecting a revised number of servers in the information technology system;
   calculating one or more revised performance characteristics for the information technology system based on the anticipated usage pattern, the desired service level, the utilization saturation point, and the revised number of servers; and
   comparing the one or more revised performance characteristics for the information technology system with one or more desired performance characteristics for the information technology system.

6. The computer program product of claim 4, wherein normalized headroom of the information technology system is calculated by dividing a headroom of the information technology system by a throughput of the information technology system.

* * * * *